Aug. 7, 1923.
I. R. HIPPENMEYER ET AL
1,463,998
BOTTLE FILLING AND CAPPING MACHINE
Filed May 14, 1919     8 Sheets-Sheet 7
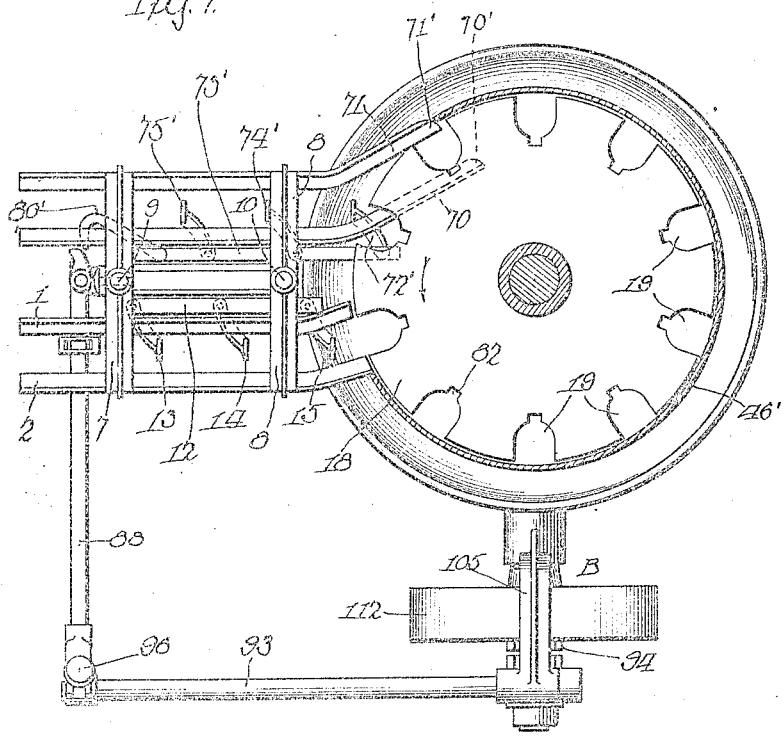
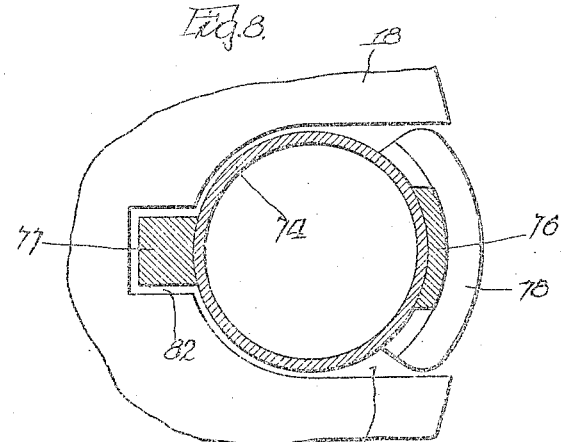

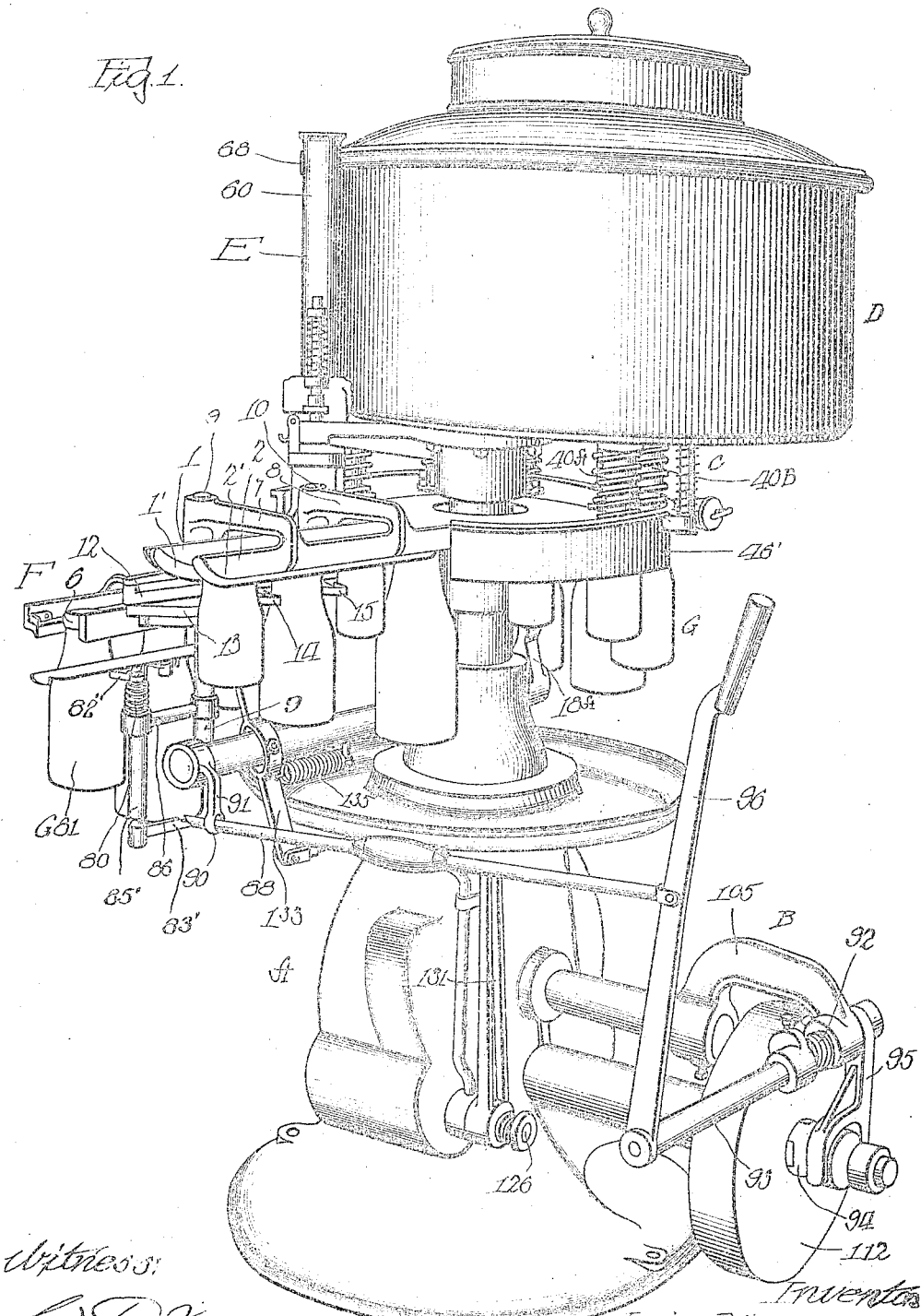

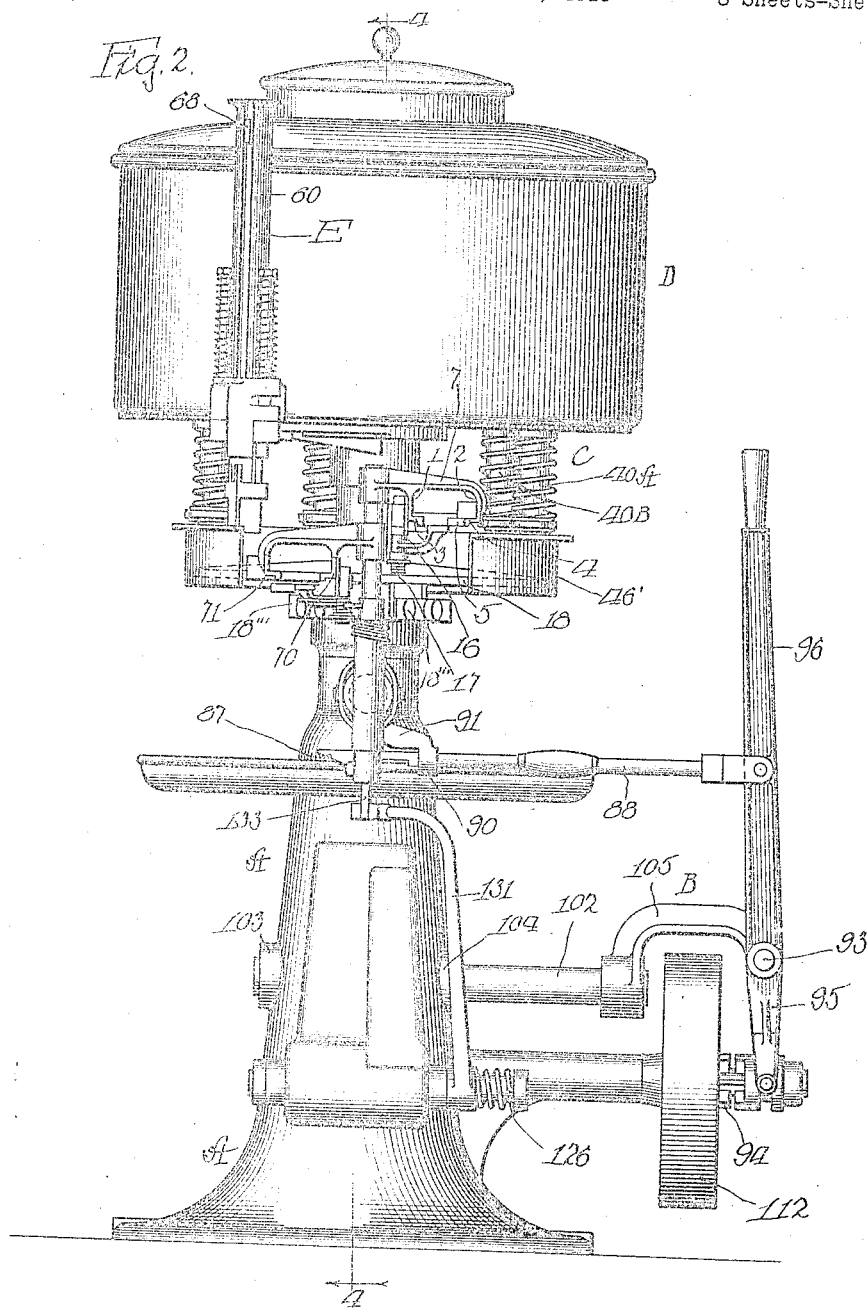

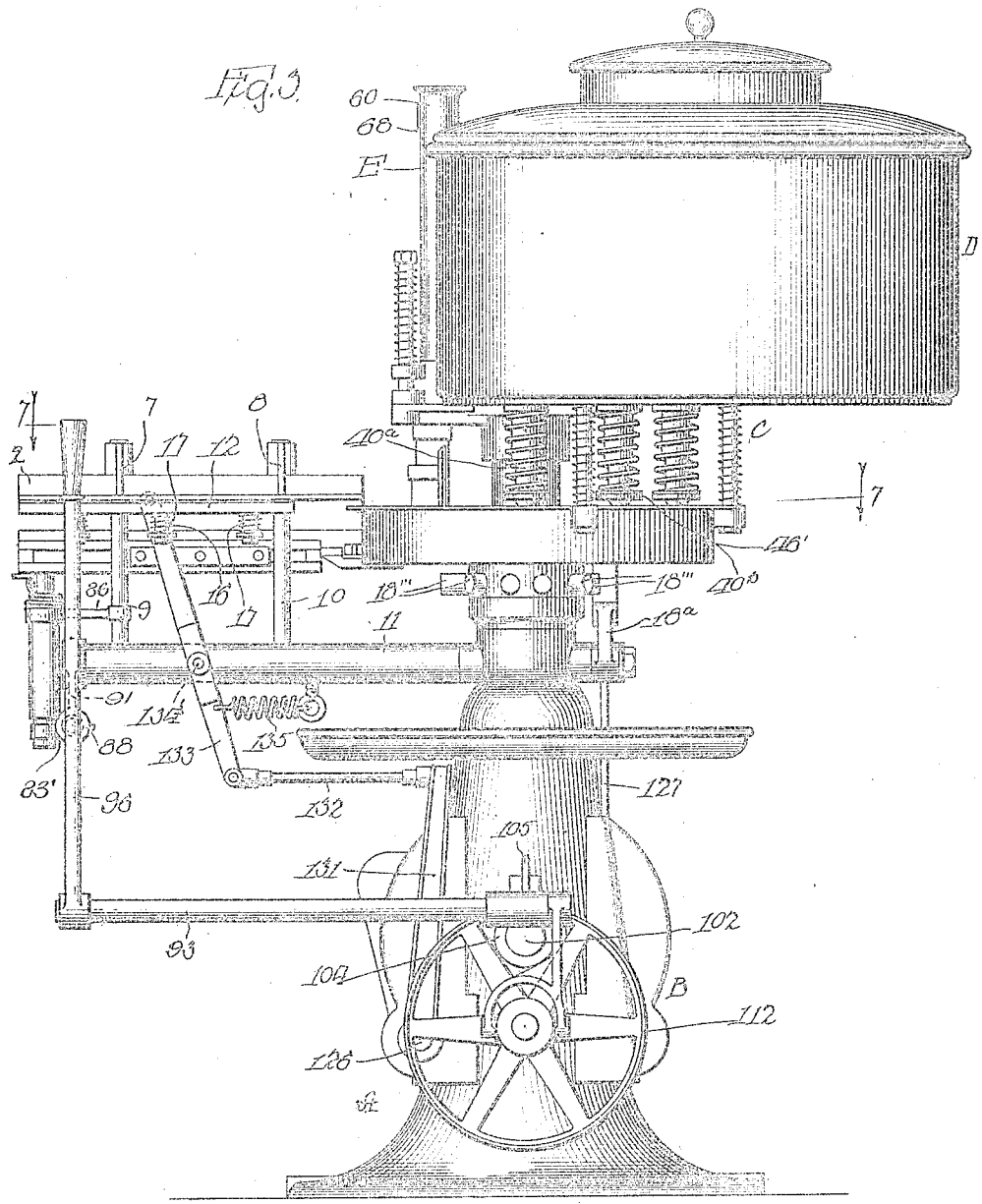

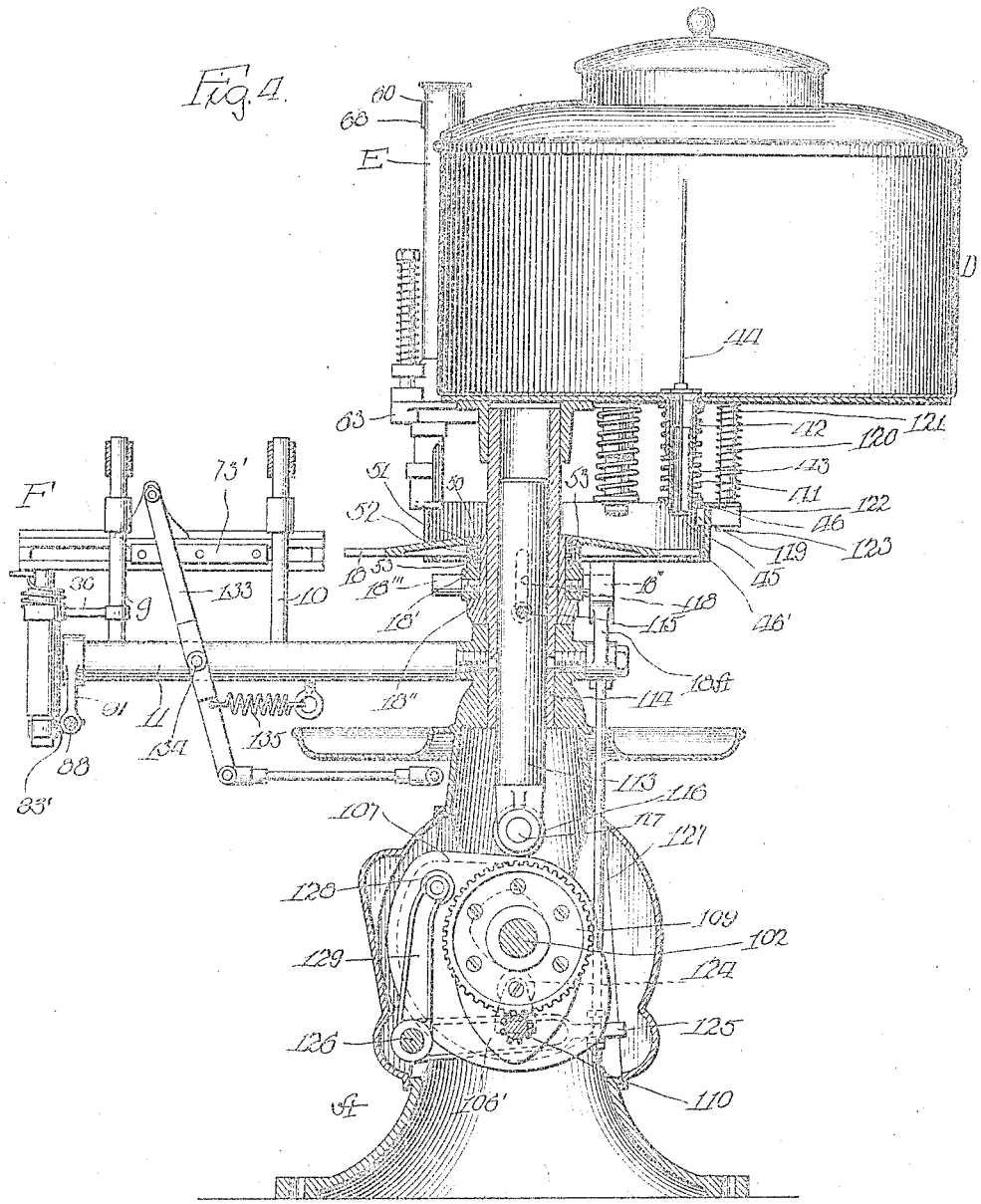

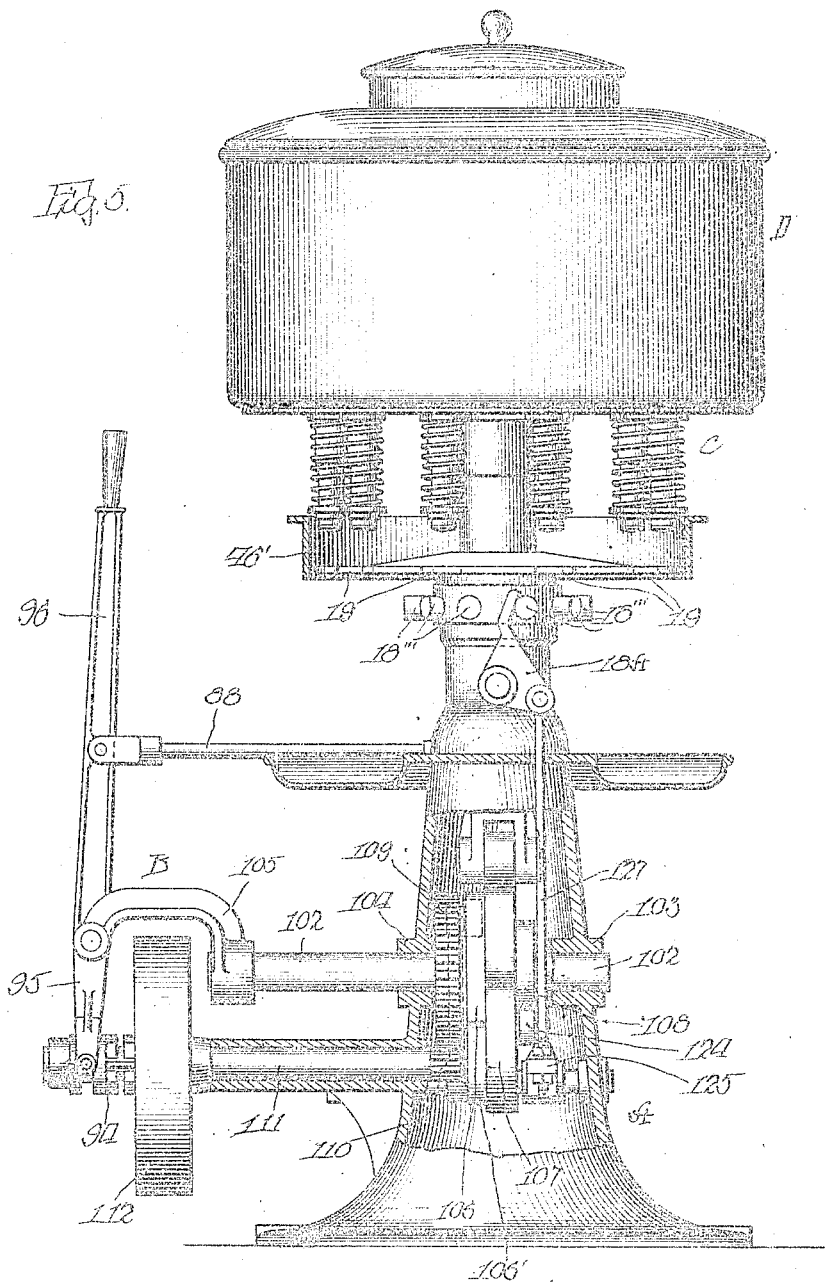

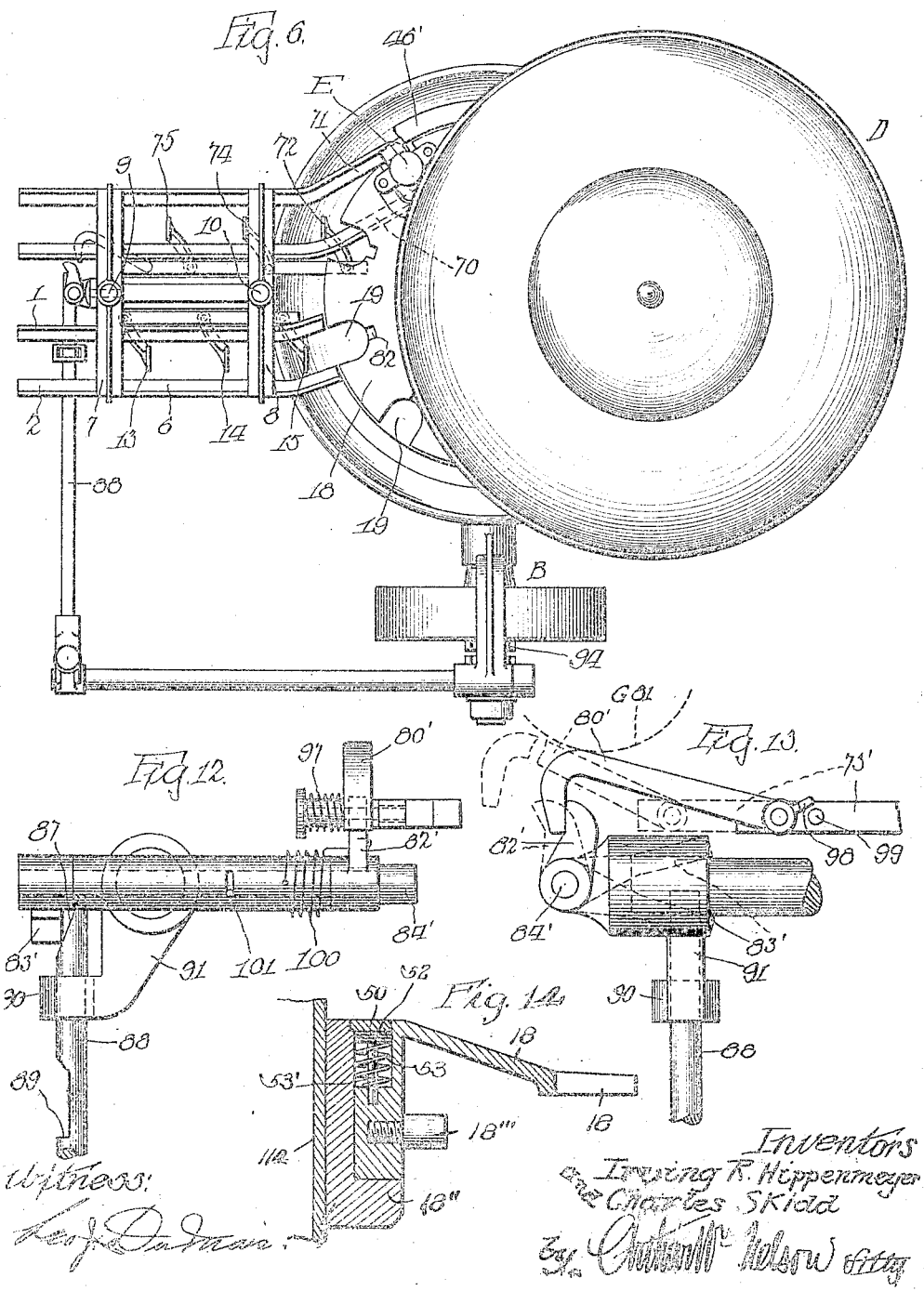

Aug. 7, 1923.
I. R. HIPPENMEYER ET AL
1,463,998
BOTTLE FILLING AND CAPPING MACHINE
Filed May 14, 1919    8 Sheets-Sheet 8
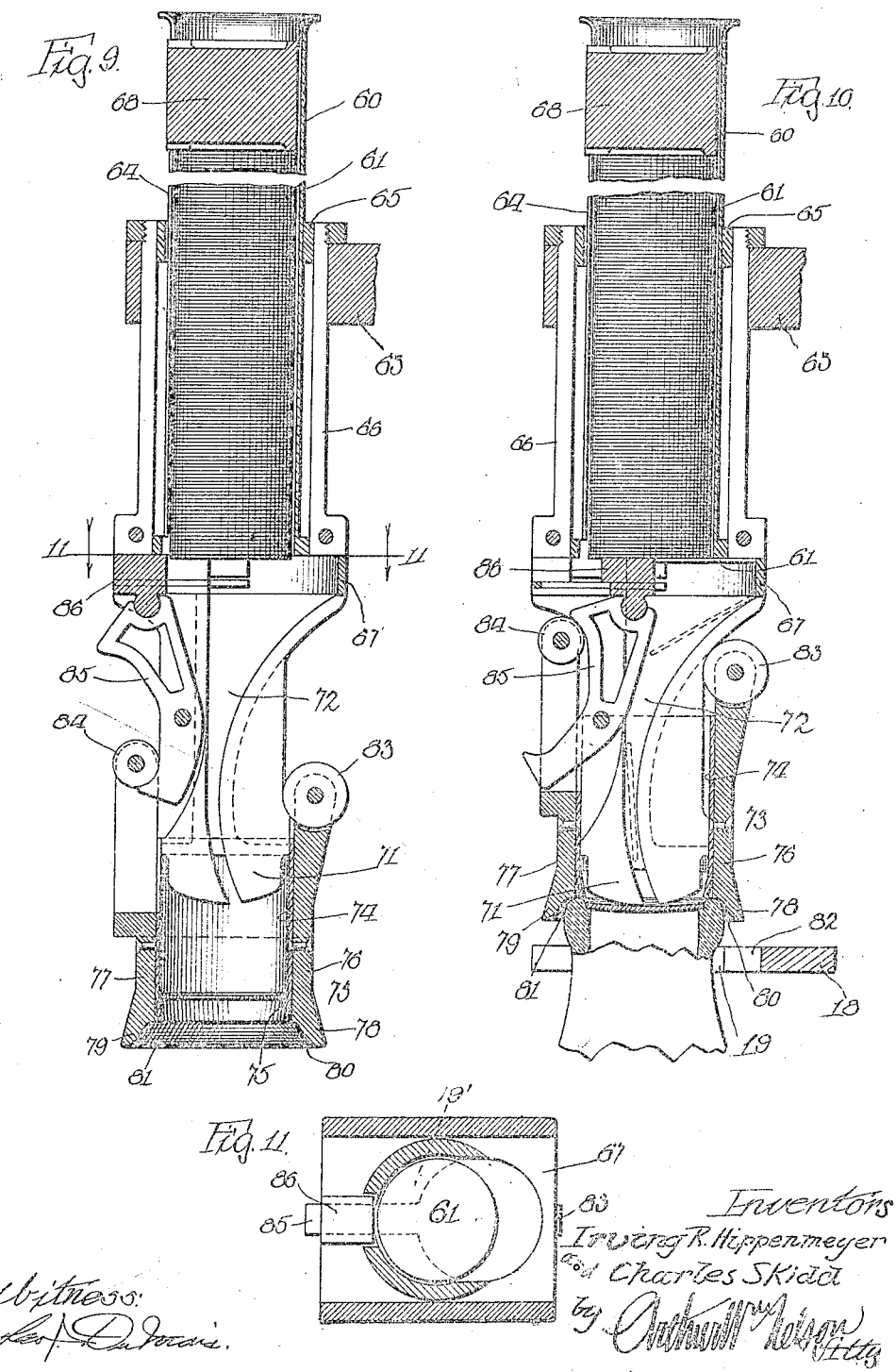

Patented Aug. 7, 1923.

1,463,998

UNITED STATES PATENT OFFICE.

IRVING R. HIPPENMEYER AND CHARLES SKIDD, OF JANESVILLE, WISCONSIN, ASSIGNORS, BY MESNE ASSIGNMENTS, TO THE H. H. MILLER INDUSTRIES COMPANY, OF CANTON, OHIO, A CORPORATION OF OHIO.

BOTTLE FILLING AND CAPPING MACHINE.

Application filed May 14, 1919. Serial No. 297,116.

*To all whom it may concern:*

Be it known that we, IRVING R. HIPPENMEYER and CHARLES SKIDD, citizens of the United States, and residents of Janesville, in the county of Rock, State of Wisconsin, have invented certain new and useful Improvements in Bottle Filling and Capping Machines, of which the following is a specification.

Our invention relates generally to improvements in bottle filling and capping machines, and relates more particularly to machines designed to fill and cap bottles of the type of which milk and cream bottles are good examples.

The general object of our invention is to provide a bottle filling and capping machine wherewith it shall be possible to fill and cap bottles in less space, in less time, with less labor and at less expense.

Another object of our invention is to provide a bottle filling and capping machine, which shall simplify the filling and capping of bottles of different capacities. Again other objects of our invention are to provide a machine adapted automatically to feed the bottles to the filling mechanism whether they be of the same or different capacities, to cap them, and automatically to withdraw after the filling and capping operations, the form arrangement and construction of the parts being such that a single operator can attend the machine.

Our invention consists generally in the form, construction, arrangement and co-action of the parts whereby the above named objects together with others that will appear hereinafter, are attainable; and our invention will be more readily understood by reference to accompanying drawings, which illustrate what we consider to be the best embodiment of our invention at the present time.

In said drawings Fig. 1 is a perspective view of a bottle filling and capping machine embodying our invention. Fig. 2 is a front elevation of the machine. Fig. 3 is a side elevation of the right hand side of the machine. Fig. 4 is a vertical sectional view substantially on the line 4—4 of Fig. 2. Fig. 5 is a rear elevation of the machine, certain of the parts being broken away and shown in section better to disclose the construction and operation of certain of the interior parts. Fig. 6 is a plain view of the machine. Fig. 7 is a transverse sectional view substantially on the line 7—7 of Fig. 3. Fig. 8 is a fragmentary view illustrating the relation that the bottom of the capper assumes with respect to the bottle-supporting member when a bottle is not in place. Fig. 9 is a vertical section of the bottle capping portion of the machine, the parts being in their passive or inoperative position. Fig. 10 is a view similar to Fig. 9, but illustrating the parts as being actuated by the bottle; Fig. 11 is a fragmentary detail view of the cap ejecting mechanism, and Figs. 12 and 13 are detail fragmentary views of the automatic stop mechanism. Fig. 14 is a detail fragmentary view of friction means for preventing undesired rotation of bottle supporting means.

In bottle filling and capping machines heretofore devised it has been necessary, when changing from a bottle of one capacity to that of another to make a large number of adjustments in various parts. For example, in some machines it is necessary to adjust the position of the liquid tank, or the capper heads, or to change the feed, or to change the relation of certain of the feeding parts. It has also been necessary to have more than one operator to properly fill, cap, and remove the bottles as they are filled and capped.

By the construction which we have devised no adjustments of any kind are necessary in changing from the operation of filling and capping bottles of one capacity to that of another capacity; and furthermore, the construction is such that but a single operator is required.

A general description of the operation of the machine will first be given as it is thought that it will simplify the understanding and the true import of the detailed description that follows. The machine comprises generally a pedestal A, on which various parts of the machine, such as the driving mechanism B, the filling mechanism C, the liquid tank D, the capping machine E, and the feeding and retracting mechanism F are carried.

The feeding and retracting mechanism comprises generally two tracks upon which the bottles G hang by the neck and along which, through suitable mechanism, they are fed forwardly on a higher ingoing track into a receiving notch formed in a circular supporting table, which table is at that time in a position of rest and in a plane corresponding to that of the upper track. Thereafter the table is lowered and rotated a tenth of a revolution until the bottle is directly under one of the filler valves, at which time mechanism is set into motion that causes the table to rise and thereby present the mouth of the bottle to the filler valve, opening the valve and partially filling the bottle. The bottle is only partially filled at any one valve to prevent foaming. The table carrying the bottle is then lowered, rotated a tenth of a revolution, until it is positioned under the next filler valve, whereupon the table rises, and the filler valve is opened to permit a further partial filling of the bottle. This operation continues until the bottle is completely filled, at which time the bottle has reached a position under the capping mechanism E, and as the table rises the capping mechanism is actuated and a cap is inserted to close the mouth of the bottle. After the bottle has been capped and while the bottle supporting table is rotating in its lower plane of movement, the bottle is automatically stripped from its supporting notch and enters the outgoing track, at which time pusher mechanism engages the same and forwards it to the outer end of the track where it can be conveniently removed by the operator. The incoming and outgoing tracks are arranged in proximate relation so that the bottles can be fed to the machine and removed therefrom conveniently by a single operator. If for any reason the operator should not remove the filled and capped bottle as it reaches the outer end of the outgoing track, further motion of the bottle actuates mechanism that stops the machine and thereby prevents the bottle from being pushed off the end of the track. The bottles hang by the neck, and for this reason quarts, pints or half pints etc. can be fed to the machine at will without the necessity of a single adjustment, so that in bottle-filling stations it becomes possible to supply the demand for a few bottles of particular capacity without waiting until a demand for enough of the bottles is received to warrant making the number of adjustments that have hitherto been necessary in order to fill a bottle of different capacity.

Of course it will be understood that when the machine is in operation there will be a plurality of bottles each being filled simultaneously (seven in this instance) so that every time the table rises a completely filled bottle will be found under the capping mechanism ready to be capped.

Having now given a general description of the construction and operation of the machine, we shall now describe the component parts in detail and it is believed that the following general order will simplify the understanding of the machine and the parts will be described in that order, to-wit: Ingoing track and feeding mechanism; bottle capping mechanism; stripper and outgoing track mechanism; automatic stop mechanism; and cams and general actuating mechanism.

*Ingoing track and feeding mechanism.*

The ingoing track is composed of two spaced vertical rails 1 and 2, which are provided with inturned horizontal bottom portions 3 and 4 defining a space 5 therebetween of a size sufficient to accommodate the neck of the bottle.

Thus as is well shown in Fig. 1, the bottles hang from the ingoing track by engagement of the portions 3 and 4 with the enlarged head 6 of the bottle. The outer ends of the tracks 1 and 2 are upturned, as indicated at 1' and 2', so that there will be no danger of the bottles falling off the end of the track and also to the end that a bottle placed in the track will slide into position. The tracks 1 and 2 are properly supported by the bracket portions 7 and 8 thereof, which are fixed upon standards 9 and 10, which in turn are carried upon an arm 11 secured to, and outstanding horizontally from, the pedestal of the machine. The bottles are fed along the tracks 1 and 2 by means of a bar 12, which carries a plurality of fingers 13, 14 and 15 pivotally secured thereto. The bar 12 is reciprocated by means to be described under "Actuating mechanism" and as the bar 12 moves towards the machine the bottles are fed along the track the desired distance at which time the bar 12 with the fingers thereon, is returned to its original position ready again to receive another bottle. Each of the fingers 13, 14 and 15 is mounted on the bar 12 by means of a vertical pivot pin 16 and a torsion spring 17 tends to hold the fingers in the position shown in the drawings while permitting them to move inwardly out of the path of the bottle as the bar returns to its outermost position, at which time the outermost finger springs into proper position, there to engage another bottle and push the same forward as the bar 12 moves inwardly at the next operation. In this manner it will be obvious that once the bottle has been placed on the ingoing track, it will be automatically fed forward without further attention.

The ingoing track, as is well shown in Figs. 6 and 7 terminates adjacent a circular plate or table 18, which is provided with a plurality of slots or recesses 19, each of a width sufficient to straddle the neck of the bottle and support the same in hanging position in the same manner that the ingoing track supports the bottle. The parts are so synchronized that when the table 18 presents one of its slots 19 in line with the ingoing track and on the same plane, as is shown in Figs. 1, 6 and 7, ready to receive a bottle, the feeding mechanism pushes the innermost bottle into the recess 19. At this instant the table is in its upper position. After the table receives a bottle, mechanism to be described under the heading "Actuating mechanism", lowers the table, rotates it a tenth of a revolution, at which time it is positioned under the first filler valve 40^A. The table is then elevated and the mouth of the bottle opens the filler valve.

The construction of the filler valve is probably best shown in Fig. 4, wherein it will be noted that it is composed of inner and outer sleeves 41 and 42, which are telescopically arranged and which are normally held in widely separated position by means of an interposed compression spring 43. Arranged centrally therein is an air tube 44, at the lower end of which will be found a valve member 45. The inner sleeve is pressed against said valve member 45 and thereby closes the valve against the flow of milk therethrough. As the bottle moves upwardly the mouth of the bottle engages the annular collar 46 which is affixed to the inner sleeve member 41, thereby raising the sleeve member away from the valve seat 45 and permitting the milk to flow into the bottle. The valve is held open a period of time only sufficient to permit partial filling of the bottle, so that an undue amount of foam will not form in the bottle. It will be understood that the air displaced by the incoming liquid passes up through the vent tube 44. Since the construction and operation of filling valves of this general type are well known, it is thought that this description will be sufficient for the present and it will be understood that any type of a valve in which the relative movement between the bottle and valve serves to actuate the valve, will be suitable for the present machine.

The table is next lowered, rotated a tenth of a revolution, at which time it is positioned under the second filler valve 40^B. The table is raised and said valve opened to permit another partial filling of the bottle. It might be well here to note that a guard member 46' is provided to hold the milk bottles in place against any forces tending to throw them off the table. In this manner the bottle is partially filled by each valve, so that when the last of the filler valves is reached the bottle is completely filled and is ready at that time to receive a cap, which is inserted by means of the bottle-capping mechanism E. The table 18 is provided with a hollow hub portion 18', which is seated upon a bushing 18" carried by the pedestal of the machine so that the table 18 rotates on the bushing 18". It is provided also with a plurality of hobs or pins 18''' which are engaged by the bell crank lever or arm 18^A, which is rocked to move the table in the right direction and to the desired extent.

As the table, together with its burden of milk bottles, is quite heavy and since the tendency thereof would be to continue in rotation when once set in motion, we provide means for resisting movement of the table, so that it is only by a positive push that it will move against the resistance. The brake or resistance means in this instance comprises a collar 50, which is arranged in the recess 51 provided in the sleeve portion 18' of the table. Friction discs 52 are also inserted in this annular space being held in place by means of suitable springs 53 which surround spring pins 53'. The friction material 52 is by this means pressed against the collar 50 carried by sleeve 18" of the pedestal and acts as a brake to prevent movement of the table except when it is positively pushed. Hence the table stops accurately under the filler valve the instant the bell crank 18^A ceases pushing it.

*Bottle capping mechanism.*

The bottle after being filled is ready to receive its cap, and the capping operation in fact is carried on simultaneously with the filling operation, for it is obvious that after the machine is in operation and the table carries its full quota of bottles, that a number of bottles will be filling while one is being capped and that as each bottle is successively filled it reaches the bottle capping position ready to receive its cap.

The bottle is capped by the mere upward movement of the table, presenting the mouth of the bottle to the capper mechanism, actuating the same, and thereby causing a cap to be pressed into the mouth of the bottle. The table is then lowered and swung forward in its lower plane, and as will be shown, shortly after the bottle leaves the capper position being carried by the table while in its lower position it is stripped from the table and pushed upon the outgoing track. The details of a suitable capper mechanism may vary considerably and the only essential elements so far as the present machine is concerned is that it should be capable of operation by the same general movements that operate the filler valves. We have, however, shown mechanism which we find well adapted to the particular work and this mechanism is best illustrated in Figs. 9, 10 and 11.

Referring to these figures it will be seen that the capper mechanism comprises the magazine 60 in which are carried in superposed relation a plurality of bottle caps 61. The magazine 60 in turn is suitably supported from the frame or pedestal of the machine by means of a bracket or arm 63, which extends outwardly from the pedestal a sufficient distance to support the capper in a position to clear the milk container. This arrangement is also enabled by the novel eccentric relation of the milk holder or chamber with respect to table 18, thereby embodying in single machines the many advantageous characteristics desired. Under the magazine will be found mechanism operable to remove the cap from the bottom of the stack and carry same in proper position ready to be pressed into the mouth of the bottle.

The magazine 60 comprises a tube enlarged at the upper end and disposed upon the cap retaining shelf 19', at the lower end. A slot, 64, extends the entire length of the tube and a guide band, 65, surrounds the same a distance above the bottom equal to the length of the body 66, above the cap ejector guide, 67. The slot serves two purposes, to-wit, it acts as a sign for observing the number of caps in the magazine, and as a guide to the cap weight, 68, which is provided with vertical grooves that engage the edges of the magazine slot. The lower portion of the body forms the hollow plunger 71. An aperture, 72, is provided in the plunger of sufficient width to allow of the free passage of the caps 61, from the magazine to the bottle. A bottle entering bell 73 of a form adapted to embrace the top of the bottle is slidably mounted on the plunger. The centering bell as here shown is formed of a steel sleeve 74 having a conically restricted bottom 75 which serves to hold the cap until it is forced out by the plunger 71. Secured to diametrically opposed parts of the sleeves 74 will be found members 76 and 77, which have portions 78 and 79 respectively that project downwardly below the bottom of the sleeve. These portions are formed with inclined bottle centering surfaces 80 and 81 respectively, so that as the bottle engages these members it will be centered should it be off center at the time of engagement. The member 77 is of such size that it will pass through the rectangular notch 82 formed in the table for that purpose as is best shown in Fig. 8. The member 78, on the other hand, is of considerably greater extent, being arcuate in form and extending practically the width of the bottle-supporting notches 19 of the table 18.

The upper portions of the members 76 and 77 are bifurcated and have mounted therein rollers 83 and 84 respectively. The roll 83 serving merely as a guide and the roll 84 serving to actuate the lever 85, which in turn reciprocates the cap ejector member 86. Thus as the bottle is moved upwardly by the table 18 it engages the centering bell or capper head, moving the same upwardly relative to the cap ejector mechanism, thereby shifting a cap laterally as indicated in Fig. 10 and at the same time inserting the cap that upon the previous operation was positioned in the constricted outlet of the sleeve, as shown in Fig. 9. It is obvious that this relative movement causes the plunger to force the cap into the mouth of the bottle as is well shown in Fig. 10. The parts 77 and 78 pass through the notch 82 and the slot 19 unless a bottle is in place and therefore no cap is discharged.

As the table lowers and the parts again assume the position shown in Fig. 9, the cap, that upon the upstroke was removed from the bottom of the magazine, is permitted to fall and take the course downwardly through the central slot somewhat as indicated by the dotted lines in Fig. 10, so that when the parts have again assumed the position shown in Fig. 9 a cap will be found in position at the constricted outlet of the head ready for insertion into the next bottle.

*Stripper and outgoing track mechanism.*

As the bottle leaves the capper position and after the table has reached its lowermost position and is rotating in that plane, the bottle engages the portions 70' and 71' of the outgoing track, which it will be noted strip the bottle from the table, causing it to move along the rails until it is in a position to be engaged by the innermost finger 72' of the sliding bar 73', which sliding bar 73' corresponds in its general construction to the sliding bar 12 of the ingoing track. The reciprocating bar 73' carries in addition to the finger 72', fingers 74' and 75', so that three bottles can be pushed by the respective fingers. The exact mechanism for actuating the reciprocating bar 73' will be described under the heading "Actuating mechanism."

It should be noted that the ingoing and outgoing tracks are arranged in proximate relation and this we do to the end that a single operator will suffice to attend to the machine, which he can do in a very easy manner because of the convenient relation of the parts, since he can readily feed bottles into the ingoing track and remove them from the outgoing track as they are successively fed outward by the mechanism just described.

In order that the outgoing bottles shall not be pushed off the track in the event the operator fails to remove them we provide automatic stop mechanism.

*Automatic stop mechanism.*

A dog, 80' is mounted on the slide bar 73', which slide bar also carries the forwarding fingers, 72', 74' and 75' of the outgoing track. When the machine is working normally and the operator is taking the bottles away from the outgoing track, the dog 80' is in a position as shown in full lines in Fig. 7 and by means of dotted lines in Fig. 13. If, however, the operator leaves a bottle G⁸¹ on the outgoing track while the slide bar 73' moves back to take another bottle off the table, then the surface of the dog 80' makes contact with the neck of the bottle G⁸¹ and as the bar moves backward the dog 80' takes the position shown in full lines in Fig. 13 and engages the trigger 82' and moves it from position shown at Fig. to the position shown in Fig. 13, and with it arm 83, which together with the trigger is attached to a vertical shaft 84' carried by bracket 85' and which in turn is mounted on the stud 86.

As the arm 83' moves from position of Fig. 1 to position of Fig. 12 its upper surface makes contact with the bevel under surface 87 on rod 88, pushing this rod upward and disengaging the notch 89 therein from the face of the ring 90 in bracket 91, where it normally rests. This rod being released, allows the torsion spring 92 which surrounds the shaft 93 to turn and in so doing throws out the clutch 94 by means of the clutch shifter 95.

To start machine again, it is necessary only to turn the shaft 93 by means of hand lever 96. This throws the clutch into mesh and also resets the knock out device by pushing rod 88 forward so that the notch again falls into place in the ring 90 of bracket 91. This cannot be done, however, until the bottle G⁸¹ has been removed.

The dog 80' is normally held by means of a torsion spring 97 which forces pin 98 against pin 99 mounted on slide bar 73'.

The trigger 82' and the arm 83' are also held in their normal positions by means of a torsion spring 100 and stop pin 101.

*Cams and general actuating mechanism.*

The cams that actuate the various parts of the machine are mounted upon a horizontally disposed stationary shaft 102, which is mounted in bearings 103 and 104 formed in the pedestal A of the machine. The shaft 102 carries at its outer end a bracket 105, which in turn supports the rock shaft 93 and clutch shifter 95 carried thereby. Mounted for rotation on the shaft 102 will be found cams 106, 107 and 108. They are all secured together (unless of integral construction) and are rotated by means of gear 109, likewise secured to the cams, which is driven by pinion 110 carried upon the shaft 111. Shaft 111, in the present instance, is driven when pulley 112 is connected thereto through the medium of clutch 94.

The raising and lowering movements of the table 18 are accomplished through the medium of the central vertical post 113, which is vertically slidable in the sleeve like part 114 of the pedestal of the machine, and which carries a pin 115 that enters the bushing 18'' so that the bushing 18'' moves with the post and thus raises and lowers the table which is seated upon the bushing by means of the hub portion 18' of the table. The lower end of the post carries a roll 116 pivotally on a pin 117, which roll rides upon the cam 107, as is well shown in Figs. 4 and 5.

The sleeve-like part 114 is slotted as indicated at 118 to permit vertical movement of the pin 115.

The upward movement of the table, in addition to raising the bottles also raises the ring or guard 46' by engagement of the edge portion thereof with lugs 119 on the inner face of the guard. The guard is enabled to rise and fall because it is slidably mounted on rods 120 depending from the milk tank. It is normally held in its lower position by means of compression springs 121, which force the lugs 122 of the guard against the heads 123 of the rods except when positively moved upward by the table as before described. It will be understood that the guard rises and lowers but does not rotate. The reason for raising and lowering is that it may always be in the proper position.

The rotation of the table is accomplished by means of cam 108, making contact with the roll 124 mounted on lever 125. The lever 125 is pivoted upon shaft 126. Thus the outer end of lever 125 is forced downward which motion is transmitted through the rod 127 to bell crank 18ᴬ, thus moving the upper arm of the bell crank forward which in turn makes contact with a round headed stud 18''' mounted on the hub 18' of the table 18. The proportions of the cam and connecting members is such as to give the table 1/10th of a revolution.

If the start of the cycle of operations is considered to commence with the table 18 at rest in its proper position, then during the first portion of the cycle portion 106' of cam 106 makes contact with roll 128 of lever 129, thus forcing this lever outward, which motion is transmitted through shaft 126, to which lever 129 is secured, to lever 131, likewise secured to shaft 126 and by means of rod 132 to lever 133. Lever 133 is pivoted at point 134. The motion is transmitted to the two slide bars 12 and 73' mounted on the ingoing and outgoing tracks by the upper part of lever 133. On the forward motion of these bars, bottles which have been previously placed on the ingoing track are fed forward and into the notches 19 of table 18 by means of feed dogs mounted on these slide bars.

When the receding side of portion 106' makes contact with roll 128, the above levers, slide bars, etc. are returned to their former positions by means of the spring 135 and it is during this portion of the stroke that the bottle which has been delivered into the outgoing track is fed outward.

As before stated, a bottle is fed into the table while the table is at rest in its uppermost position and a bottle is taken out of the table while it is in its lowest position and making a tenth revolution.

From the detailed description given with reference to the accompanying it becomes apparent that the objects and purposes of the invention are attained by the structure of the instant case, but inasmuch as this disclosure will readily suggest to others, skilled in the art to which this appertains, modified structure whereby the substantial objects and purposes thereof may be attained, we do not wish to be limited to the construction and arrangement herein shown and described except only as may be necessary by limitations in the hereunto appended claims.

We claim:

1. A bottle filling machine embodying therein a liquid receptacle, a valve therein, means for suspending a bottle by the neck, means for moving the bottle suspending means to present the mouth of the bottle to said valve, and means for automatically feeding bottles to said bottle suspending means.

2. A bottle filling machine embodying therein a liquid receptacle, a valve therein, means for suspending a bottle by the neck and for presenting the mouth thereof to said valve, and other means for suspending bottles by the neck and for automatically removing bottles from said bottle suspending and presenting means.

3. A bottle filling machine embodying therein a liquid receptacle, a valve therein, means for supporting a bottle by the neck, and means for moving the bottle supporting means in a straight vertical path and thereby presenting the mouth of the bottle to said valve.

4. A bottle filling machine embodying therein a liquid receptacle, a valve therein, means for suspending a bottle by the neck and by a straight vertical movement presenting the mouth thereof to said valve, and means operable relatively close to the neck for automatically removing bottles from said bottle suspending and presenting means.

5. A bottle filling machine embodying therein a liquid receptacle, a plurality of valves therein, means for suspending a plurality of bottles by the neck, for presenting the mouths thereof to said valves and for holding them there a period of time sufficient to fill but part of each bottle, for removing said bottles from said valves and for successively presenting them thereto until filled.

6. A bottle filling machine embodying therein, a liquid receptacle, a plurality of valves therein, means for suspending a plurality of bottles by the neck and for presenting the mouths thereof to said valves and for holding them there a period of time sufficient to fill but part of each bottle, for removing said bottles from said valves and for successively presenting them thereto until filled, and other means for automatically removing the filled bottles from said bottle suspending and presenting means.

7. A bottle filling and capping machine embodying therein, a capper mechanism; a liquid receptacle, a plurality of valves therein; means for suspending a plurality of bottles by the neck, for presenting the mouths thereof to said valves, for holding them there a period of time sufficient to fill but part of each bottle, for removing said bottles from said valves and for successively presenting them thereto until filled and thereafter presenting them to and actuating said capper mechanism.

8. A bottle filling and capping machine embodying therein, a capper mechanism; a liquid receptacle, a plurality of valves therein; means for suspending a plurality of bottles by the neck, for presenting the mouths thereof to said valves, for holding them there a period of time sufficient to fill but part of each bottle, for removing said bottles from said valves and for successively presenting them thereto until filled, and for successively presenting them to and actuating said capper mechanism, and other means for automatically removing the filled and capped bottles from said bottle suspending and presenting means.

9. A bottle filling machine embodying therein a liquid receptacle, a valve therein, means for suspending a bottle by the neck and for presenting the mouth thereof to said valve, means operable relatively close to the neck for automatically feeding bottles to said bottle suspending and presenting means, means for automatically removing bottles therefrom, and means actuated by the removed bottles, upon reaching a predetermined point, and operable automatically to stop the machine.

10. A bottle filling machine embodying therein a liquid receptacle, a valve therein, means for suspending a bottle by the neck and by a straight vertical movement presenting the mouth thereof to said valve, means operable relatively close to the neck for automatically removing bottles from said bottle suspending and presenting means, and means actuated by the removed bottles, upon reaching a predetermined point, and operable automatically to stop the machine.

11. A bottle filling machine embodying therein a liquid receptacle, a valve therein, means for supporting a bottle by the neck, means for causing relative rotative movements between the bottle supporting means and the liquid receptacle, and means for moving the bottle supporting means to and from the liquid receptacle.

12. A bottle filling machine embodying therein a liquid receptacle, a valve therein, means for suspending a bottle by the neck, means for causing relative rotative movements between the bottle suspending means and the liquid receptacle, means for moving the bottle suspending means to and from the liquid receptacle, and means for resisting the relative rotative movement between the bottle suspending means and the liquid receptacle.

13. A bottle filling machine embodying therein a liquid receptacle, a valve therein, means for suspending a bottle by the neck, means for causing relative rotative movement between the bottle suspending means and the liquid receptacle, means for moving the bottle suspending means to and from the liquid receptacle, means for automatically removing bottles from said bottle suspending means, and means actuated by the removed bottles, upon reaching a predetermined point, operable automatically to stop the machine.

14. A bottle filling machine embodying therein a liquid receptable, a valve therein, means for suspending a bottle by the neck, means for causing relative rotative movement between the bottle suspending means and the liquid receptacle, means for moving the bottle suspending means to and from the liquid receptacle, means for resisting the relative rotative movement between the bottle suspending means and the liquid receptacle, means for automatically removing bottles from said bottle suspending means, and means actuated by the removed bottles, upon reaching a predetermined point, operable automatically to stop the machine.

15. A bottle filling machine embodying therein a liquid receptacle, a valve therein, means for supporting a bottle by the neck, means for causing relative rotative movement between the bottle supporting means and the liquid receptacle, means for moving the bottle supporting means to and from the liquid receptacle, and a bottle guard surrounding the bottle supporting means and movable to and from the liquid receptacle with said bottle supporting means.

16. A bottle filling and capping machine embodying therein a capper mechanism, a liquid receptacle having a valve therein, means for supporting a bottle by the neck and for presenting the mouth thereof first to said valve and subsequently to said capper mechanism, thereby actuating both the valve and the capper mechanism, said bottle supporting and presenting means being formed with an opening in order to pass upwardly around both the valve and capper when the bottle is not in place, as and for the purpose specified.

17. A bottle filling machine embodying therein a liquid receptacle, a valve therein, means for suspending a bottle by the neck, and means for moving the bottle suspending means to present the mouth of the bottle to said valve.

18. A bottle filling and capping machine adapted to discharge a filled and capped bottle at each operation and embodying therein a liquid receptacle, a plurality of valves therein, a capper mechanism, means for suspending a plurality of bottles by the neck, means for moving said bottle suspending means to present a plurality of bottles to said valves and one bottle to said capping mechanism, for withdrawing the bottles from said valve and capper mechanism and for advancing the bottles to present another bottle to said capper mechanism and the bottles to different valves.

19. A bottle filling machine embodying therein a liquid receptacle, a plurality of valves therein, means for supporting a plurality of bottles by the neck and for raising and lowering said bottle supporting means to present the mouths thereof to said valves and to remove them therefrom, said means being vertically slidable, means for feeding a bottle to said bottle supporting means when same is in its upper position, means for rotating same in its lowered position, and means for removing a bottle from said supporting means while in its lowered position.

20. A bottle filling machine embodying therein a liquid receptacle, a valve therein, means for suspending a bottle, means for causing relative rotative movements between the bottle suspending means and the liquid receptacle, means for causing relative vertical movement between the bottle suspending means and the liquid receptacle, and means for resisting the relative rotative movement between the bottle suspending means and the liquid receptacle.

21. A bottle filling machine embodying therein a liquid receptacle, a valve therein, means for suspending a bottle, means for causing relative rotative movement between the bottle suspending means and the liquid receptacle, means for causing relative vertical movement between the bottle suspending means and the liquid receptacle, means for resisting the relative rotative movement between the bottle suspending means and the liquid receptacle, and means for automatically feeding bottles to said bottle suspending means.

22. A bottle filling and capping machine embodying therein a capper mechanism, a liquid receptacle, having a valve therein, means for suspending a bottle and for presenting the mouth thereof first to said valve and subsequently to said capper mechanism, thereby actuating both the valve and the capper mechanism, said bottle suspending and presenting means being constructed and arranged with an opening to pass upwardly around both the valve and capper when the bottle is not in place, as and for the purpose specified.

23. A bottle filling and capping machine embodying therein a liquid receptacle having a valve therein, relative means for suspending a bottle, positioned under said receptacle and out of axial alinement with respect to the liquid receptacle, a capper mechanism positioned along the outer part of said receptacle, and means for moving said bottle suspending means to present the mouth of the bottle first to said valve and then to said capper mechanism.

24. A bottle filling machine embodying therein a liquid receptacle, a plurality of valves therein, means for supporting a plurality of bottles and for raising and lowering said bottle supporting means to present the mouths thereof to said valves, means for feeding a bottle to said bottle supporting means when same is in its upper position, means for rotating same in its lowered position, and means for removing a bottle from said supporting means while rotating in its lowered position.

25. In apparatus of the class described, the combination of a capper mechanism, a liquid receptacle having a valve, means for suspending bottles by their necks and moving them step-by-step rotatively relative to said valve and said capper mechanism, and means for moving said suspending means toward and from said valve and said capper mechanism to engage each bottle mouth first with said valve to fill the bottle and then with said capper mechanism to cap the bottle.

In testimony whereof we have hereunto set our hands.

IRVING R. HIPPENMEYER.
CHARLES SKIDD.